United States Patent
Yoshida

(10) Patent No.: US 6,735,153 B2
(45) Date of Patent: May 11, 2004

(54) METHOD AND APPARATUS FOR SETTING RECORDING PARAMETER ON NON-USED AREA OF OPTICAL RECORDABLE DISC

(75) Inventor: Masayoshi Yoshida, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 186 days.

(21) Appl. No.: 09/974,825

(22) Filed: Oct. 12, 2001

(65) Prior Publication Data

US 2002/0044503 A1 Apr. 18, 2002

(30) Foreign Application Priority Data

Oct. 13, 2000 (JP) .................................... P2000-313588

(51) Int. Cl.$^7$ .............................................. G11B 21/08
(52) U.S. Cl. .................... 369/30.18; 369/116; 369/47.5
(58) Field of Search ............................ 369/30.18, 47.5, 369/47.53, 47.55, 53.2, 53.41, 13.27, 13.26, 116

(56) References Cited

U.S. PATENT DOCUMENTS

| | | | |
|---|---|---|---|
| 5,072,435 A | | 12/1991 | Bakx ........................ 368/48 |
| 5,226,027 A | * | 7/1993 | Bakx ........................ 369/47.55 |
| 5,898,655 A | | 4/1999 | Takahashi .................. 369/54 |
| 6,208,601 B1 | * | 3/2001 | Shimizu et al. .......... 369/53.19 |
| 6,556,524 B1 | * | 4/2003 | Takeshita ................. 369/47.43 |

FOREIGN PATENT DOCUMENTS

| | | | |
|---|---|---|---|
| JP | 8-329469 | 12/1996 | |
| JP | 11-175977 | 7/1999 | |
| JP | 11-175977 A | * 7/1999 | .................. 369/116 |

* cited by examiner

*Primary Examiner*—Tan Dinh
(74) *Attorney, Agent, or Firm*—Morgan, Lewis & Bockius LLP

(57) ABSTRACT

When setting a recording power for use in recording optical information on a DVD-R, by using any one of sectors provided on the DVD-R as a PCA, whether a predetermined special detected signal is detected or not in the sectors is checked (Step S2), a non-used sector where no special detected signal is detected, of the sectors, is retrieved, based on the check result (Step S3), a mark signal for obtaining the special detected signal is recorded in the retrieved non-used sector (Step S5), a setting signal for setting a recording power is recorded in the non-used sector excluding the area where at least the mark signal is recorded (Step S6), and the recorded setting signal is optically detected to set the recording power (Step S13).

28 Claims, 5 Drawing Sheets

METHOD AND APPARATUS FOR SETTING RECORDING PARAMETER ON NON-USED AREA OF OPTICAL RECORDABLE DISC

BACKGROUND OF THE INVENTION

1. Field of the Invention

The present invention relates to a technical field of a parameter setting apparatus, a parameter setting method, an information recording apparatus, an information recording method, and an information recording medium. More particularly, it relates to a technical field of a parameter setting apparatus and a parameter setting method for setting a recording parameter, which is used for recording information to a recording medium, before a recording of information, an information recording apparatus and an information recording method, including the above parameter setting apparatus, for recording information, and an information recording medium in which a setting program for setting the recording parameter is recorded in a readable way by a computer.

2. Description of the Related Art

Recently, a DVD that is an optical disk having extremely higher storage capacities than a conventional CD (Compact Disc) is standardized, and a read-only DVD is in general use.

Further, not only the read-only DVD but also a rewritable progresses in standardization.

As the recordable DVD, there are a DVD-R (DVD-Recordable) that is a DVD capable of recording information only once (namely, capable of writing once) and a DVD-RW (DVD-Re-Recordable) capable of recording information multiple times, and the both DVDs are sequentially being standardized.

Generally, when information is recorded in the recordable DVD, optical beams for recording, which is intensive-modulated in accordance with the information to be recorded, is irradiated on the DVD so as to record the information. Therefore, it is necessary to perform calibration processing on the intensity of the optical beams (hereinafter, referred to as a recording power simply) every time information is recorded. This is why there is some case where the optimum recording power at the information recording may vary, caused by a stain of the recordable DVD itself, temperature, or a time-varying reflectivity on the information recorded surface.

Accordingly, the above DVD-R standard defines that an area referred to as a PCA (Power Calibration Area) and an RMA (Recording Management Area) should be at a position inward from the lead-in area in the DVD-R, in order to do the calibration processing.

The PCA is divided into several sectors and the calibration processing will be executed by using one or several sectors. More concretely, in the PCA corresponding to one or several sectors, while increasing the recording power step-by-step from a predetermined minimum value to a predetermined maximum value, setting signals having the random pulse width, for example, from 3T to 11T (T is the time unit for use in recording information by the information recording appratus R) are sequentially recorded, and the recorded setting signals are sequentially detected and reproduced, from that one recorded with the minimum recording power. The recording power used for recording a setting signal in which the peak level is equal to the bottom level in every reproduced signal corresponding to the above pulse width at a time of the playback, is set as the optimum recording power of the optical beam in the information recording, and thereafter, actual recording of the recording information is executed by use of the optical beam of the optimum recording power.

The optimum recording power thus calculated and the number of a sector within the PCA used for setting the optimum recording power (in a short, the number of a used sector) are recorded within the RMA in a distinguishable way, as the calibration information and thereafter, the recording of the actual recording information starts.

In the above-mentioned DVD-R, since the information can be recorded only once on the overall surface thereof, a sector within the PCA used once for the optimization of the recording power cannot be used for the optimization thereafter. At this time, if a new recording power is optimized by use of the used sector by mistake, the recording power cannot be optimized accurately, thereby failing in the accurate information recording thereafter.

In the above DVD-R standard, in the next calibration processing of the recording power, standardized is that a sector within the PCA which has never been used for the calibration processing so far is retrieved by referring to the description within the RMA and that the calibration processing of the recording power is executed by use of the retrieved non-used sector.

However, that there are 400 areas capable of describing calibration history in the RMA, is standardized, and the timing (for example, at an eject time of the DVD-R after finishing recording) when the calibration history should be described is not standardized. Owing to this, there are some cases where the calibration history cannot be described assuredly or some cases where the corresponding area after description of the calibration history cannot be retrieved accurately. In these cases, it becomes impossible to distinguish which sector is a used one within the PCA, which results in making a mistake of performing the calibration processing using a used sector.

To cope with the above problem, heretofore, there is adopted a method of detecting a detected/playback signal corresponding to an actually recorded setting signal by scanning the PCA using the optical beams and retrieving a used sector from the level thereof, as disclosed in, for example, Japanese Patent Application Laid-Open No. 11-175977.

According to the above-mentioned conventional retrieval method of the used sector, as for a sector where a setting signal is recorded with the minimum recording power (near to zero level), since the recording power is too small to detect a detected/playback signal in the retrieval method, it may be regarded as the non-used sector, even if a used-sector. Therefore, the calibration processing of the recording power may be performed by using a used sector, similarly in the conventional method, thereby failing in the accurate calibration processing.

SUMMARY OF THE INVENTION

In consideration of the above problem, an object of the present invention is to provide a parameter setting apparatus and a parameter setting method capable of accurately retrieving a non-used sector in the PCA and performing the accurate calibration of the recording power by use of the above non-used sectors an information recording apparatus and an information recording method for information recording, including the above parameter setting apparatus, and an information recording medium with a setting program for setting the recording parameter recorded there in a readable way by a computer.

The above object of the present invention can be achieved by a parameter setting apparatus of the present invention for setting a recording parameter for use in optical information recording on a recording medium, by use of any one of a plurality of setting areas previously provided on the recording medium. The apparatus is provided with: a checking device for checking whether a special detected signal is optically detected or not from the setting areas; a retrieving device for retrieving a non-used area that is the setting area where no special detected signal is detected, of the setting areas, based on the check result of the checking device; a mark signal recording device for optically recording a mark signal for obtaining the special detected signal optically, in the detected non-used setting area setting signal recording device for recording a setting signal for setting the recording parameter, at least, in the non-used setting area excluding an area where the mark signal is recorded; and a setting device for setting the recording parameter by optically detecting the recorded setting signal.

According to the present invention, since the non-used setting area is retrieved by referring to the special detected signal, so that the mark signal and the setting signal is recorded, and the recording parameter is set by use of the recorded setting signal, it is possible to retrieve the non-used setting area accurately and set the recording parameter accurately by use of this. Therefore use of the accurately-set recording parameter enables the accurate and assured information recording.

In one aspect of the present invention, the mark signal recording device records the mark signal at a position detected prior to the setting signal recorded in the non-used setting area.

According to this aspect, since the mark signal is recorded at a position detected prior to the setting signal, the accurate detection of the first detected position in the setting area enables accurate detection of a non-used setting area.

In another aspect of the present invention, the mark signal recording device repeats the recording of the mark signal at a predetermined interval during the recording of the setting signal.

According to this aspect, since the mark signal is recorded at a predetermined interval during recording the setting signal, it is possible to prevent from a detection mistake of a non-used setting area caused by detecting no special detected signal for a long time.

In further aspect of the present invention, the checking device is further provided with: a position retrieving device for retrieving a predicted position of the setting area on the recording medium where the special detected signal is to be optically detected; a first moving device for moving an executing device for detecting the setting signal and the special detected signal, from the retrieved predicted position, to a retrieval starting position on the recording medium distant from there at least by a distance corresponding to the predetermined interval; and a second moving device for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not In addition, the retrieving device regards the setting area adjacent to the setting area where the special detected signal detected last is recorded as the non-used setting area, when none of the special detected signal is detected while the executing device is moved from the retrieval starting position to the predicted position.

According to this aspect, since a non-used setting area is detected based on the special detected signal while repeating the transition of the executing device from the retrieval starting position to the predicted position and the update of the retrieval starting position, it is possible to detect the non-used setting area accurately.

In further aspect of the present invention, the recording parameter is intensity of an optical beam for use in the information recording.

According to this aspect, use of a non-used setting area enables the accurate setting of the intensity of the recording optical beam.

In further aspect of the present invention, the apparatus is further provided with a recording device for executing the information recording by use of the set recording parameter.

According to this aspect, use of the accurately-set recording parameter enables the accurate and assured information recording.

The above object of the present invention can be achieved by a parameter setting method of the present invention for setting a recording parameter for use in optical information recording on a recording medium, using any one of a plurality of setting areas previously provided on the recording medium. The method is provided with: a checking process for checking whether a special detected signal is optically detected or not from the setting areas; a retrieving process for retrieving a non-used area that is the setting area where no special detected signal is detected, of the setting areas, based on the check result in the checking process, a mark signal recording process for optically recording a mark signal for obtaining the special detected signal optically, in the detected non-used setting area; a setting signal recording process for recording a setting signal for setting the recording parameter, at least, in the non-used setting area excluding an area where the mark signal is recorded; and a setting process for setting the recording parameter by optically detecting the recorded setting signal.

According to the present invention, since a non-used setting area is retrieved by referring to the special detected signal, so to record the mark signal and the setting signal and the recording parameter is set by use of this recorded setting signal, it is possible to retrieve the non-used setting area accurately and set the recording parameter accurately by use of this. Therefore use of the accurately-set recording parameter enables the accurate and assured information recording.

In one aspect of the present invention, in the mark signal recording process, the mark signal is recorded at a position detected prior to the setting signal recorded in the non-used setting area.

According to this aspect, since the mark signal is recorded at a position detected prior to the setting signal, the accurate detection of the first detected position in the setting area enables accurate detection of a non-used setting area.

In another aspect of the present invention, in the mark signal recording process, the recording of the mark signal is repeated at a predetermined interval during the recording of the setting signal.

According to this aspect, since the mark signal is recorded at a predetermined interval during recording the setting signal, it is possible to prevent from a detection mistake of a non-used setting area caused by detecting no special setting signal for a long time.

In further aspect of the present invention, the checking process is further provided with: a position retrieving process for retrieving a predicted position of the setting area on the recording medium where the special detected signal is to be optically detected; a first moving process for moving an executing device for detecting the setting signal and the special detected signal, from the retrieved predicted position, to a retrieval starting position on the recording medium distant from there at least by a distance corresponding to the predetermined interval; and a second moving process for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not. In addition, in the retrieving process, the setting area adjacent to the setting area where the special detected signal detected last is recorded, is regarded as the non-used setting area, when none of the special detected signal is detected while the executing device is moved from the retrieval starting position to the predicted position.

According to this aspect, since a non-used setting area is detected based on the special detected signal while repeating the transition of the executing device from the retrieval starting position to the predicted position and the update of the retrieval starting position, it is possible to detect the non-used setting area accurately.

In further aspect of the present invention, the recording parameter is intensity of an optical beam for use in the information recording.

According to this aspect, use of a non-used setting area enables the accurate setting of the intensity of the recording optical beam.

In further aspect of the present invention, the method is further provided with a recording process for executing the information recording by use of the set recording parameter.

The above object of the present invention can be achieved by an information recording medium of the present invention in which a setting program is recorded in a readable way by a setting computer, which is included in a recording parameter setting apparatus for setting a recording parameter for use in optical information recording on the recording medium, using any one of a plurality of setting areas previously provided on the recording medium. The setting program causes the setting computer to function as: a checking device for checking whether a special detected signal is optically detected or not from the setting areas; a retrieving device for retrieving a non-used area that is the setting area where no special detected signal is detected, of the setting areas, based on the check result of the checking device; a mark signal recording device for optically recording a mark signal for obtaining the special detected signal optically, in the detected non-used setting area; a setting signal recording device for recording a setting signal for setting the recording parameter, at least, in the non-used setting area excluding an area where the mark signal is recorded; and a setting device for setting the recording parameter by optically detecting the recorded setting signal.

According to the present invention, since the setting computer works so as to retrieve a non-used setting area by referring to the special detected signal to record the mark signal and the setting signal and so as to set the recording parameter by use of this recorded setting signal, it is possible to retrieve the non-used setting area accurately and set the recording parameter accurately by use of this Therefore use of the accurately-set recording parameter enables the accurate and assured information recording.

In one aspect of the present invention, the mark signal recording device records the mark signal at a position detected prior to the setting signal recorded in the non-used setting area.

According to this aspect, since the setting computer works so as to record the mark signal at a position detected prior to the setting signal, the accurate detection of the first detected position in the setting area enables accurate detection of a non-used setting area.

In another aspect of the present invention, the mark signal recording device repeats the recording of the mark signal at a predetermined interval during the recording of the setting signal.

According to this aspect, since the setting computer works so as to record the mark signal at a predetermined interval during recording the setting signal, it is possible to prevent from a detection mistake of a non-used setting area caused by detecting no special setting signal for a long time.

In further aspect of the present invention, the checking device is further provided with: a position retrieving device for retrieving a predicted position of the setting area on the recording medium where the special detected signal is to be optically detected; a first moving device for moving an executing device for detecting the setting signal and the special detected signal, from the retrieved predicted position, to a retrieval starting position on the recording medium distant from there at least by a distance corresponding to the predetermined interval; and a second moving device for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not. In addition, the retrieving device regards the setting area adjacent to the setting area where the special detected signal detected last is recorded as the non-used setting area, when none of the special detected signal is detected while the executing device is moved from the retrieval starting position to the predicted position.

According to this aspect, since the setting computer works so as to detect a non-used setting area based on the special detected signal while repeating the transition of the executing device from the retrieval starting position to the predicted position and the update of the retrieval starting position, it is possible to detect the non-used setting area accurately.

In further aspect of the present invention, the recording parameter is intensity of an optical beam for use in the information recording.

According to this aspect, use of a non-used setting area enables the accurate setting of the intensity of the recording optical beam.

In further aspect of the present invention, the setting program further causes the setting computer to function as a recording device for executing the information recording by use of the set recording parameter.

According to this aspect, use of the accurately-set recording parameter enables the accurate and assured information recording.

The above object of the present invention can be achieved by a computer data signal embodied in a carrier wave and representing a sequence of instructions of the present invention, which is executed by a setting computer, which is included in a recording parameter setting apparatus for setting a recording parameter for use in optical information recording on the recording medium, using any one of a plurality of setting areas previously provided on the recording medium. The instructions is provided with the steps of: checking whether a special detected signal is optically detected or not from the setting areas; retrieving a non-used area that is the setting area where no special detected signal is detected, of the setting areas, based on the check result of the step of checking; optically recording a mark signal for obtaining the special detected signal optically, in the detected non-used setting area; recording a setting signal for setting the recording parameter, at least, in the non-used setting area excluding an area where the mark signal is recorded, and setting the recording parameter by optically detecting the recorded setting signal.

According to the present invention, since the setting computer works so as to retrieve a non-used setting area by referring to the special detected signal to record the mark signal and the setting signal and so as to set the recording parameter by use of this recorded setting signal, it is possible to retrieve the non-used setting area accurately and set the recording parameter accurately by use of this. Therefore use of the accurately-set recording parameter enables the accurate and assured information recording.

In one aspect of the present invention, the step of optically recording the mark signal records the mark signal at a position detected prior to the setting signal recorded in the non-used setting area.

According to this aspect, since the setting computer works so as to record the mark signal at a position detected prior to the setting signal, the accurate detection of the first detected position in the setting area enables accurate detection of a non-used setting area.

In another aspect of the present invention, the step of optically recording the mark signal repeats the recording of the mark signal at a predetermined interval during the recording of the setting signal.

According to this aspect, since the setting computer works so as to record the mark signal at a predetermined interval during recording the setting signal, it is possible to prevent from a detection mistake of a non-used setting area caused by detecting no special setting signal for a long time.

In further aspect of the present invention, the step of checking is further provided with the steps of: retrieving a predicted position of the setting area on the recording medium where the special detected signal is to be optically detected; moving an executing device for detecting the setting signal and the special detected signal, from the retrieved predicted position, to a retrieval starting position on the recording medium distant from there at least by a distance corresponding to the predetermined interval; and repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not, and the step of retrieving the non-used area regards the setting area adjacent to the setting area where the special detected signal detected last is recorded as the non-used setting areas when none of the special detected signal is detected while the executing device is moved from the retrieval starting position to the predicted position.

According to this aspect, since the setting computer works so as to detect a non-used setting area based on the special detected signal while repeating the transition of the executing device from the retrieval starting position to the predicted position and the update of the retrieval starting position, it is possible to detect the non-used setting area accurately.

In further aspect of the present invention, the recording parameter is intensity of an optical beam for use in the information recording.

According to this aspect, use of a non-used setting area enables the accurate setting of the intensity of the recording optical beam.

In further aspect of the present invention, the instructions are further provided with the step of executing the information recording by use of the set recording parameter.

According to this aspect, use of the accurately-set recording parameter enables the accurate and assured information recording.

DESCRIPTION OF THE PREFERRED EMBODIMENT

A preferred embodiment of the present invention will be described with reference to the drawings.

An embodiment described below is an embodiment when the present invention is adopted to the setting processing of the recording power performed prior to the actual information recording processing, in an information recording apparatus for recording information in the DVD-R as the above recording medium.

A schematic structure and operation of an information recording apparatus of the embodiment will be described by referring FIG. 1 and FIG. 2.

Figure 1:
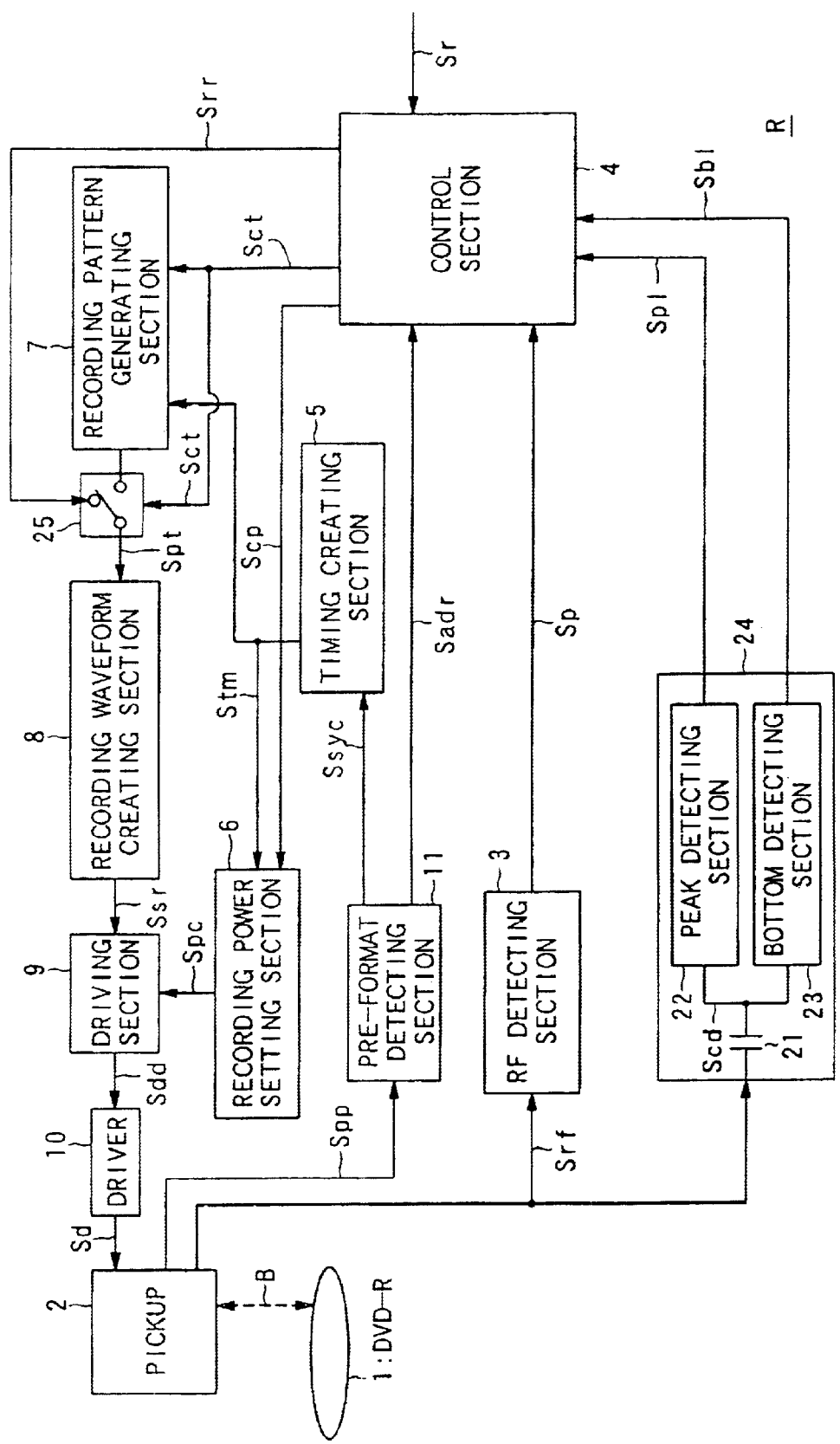
FIG. 1 is a block diagram showing a schematic structure of an information recording apparatus according to a preferred embodiment of the present invention.
Figure 2:
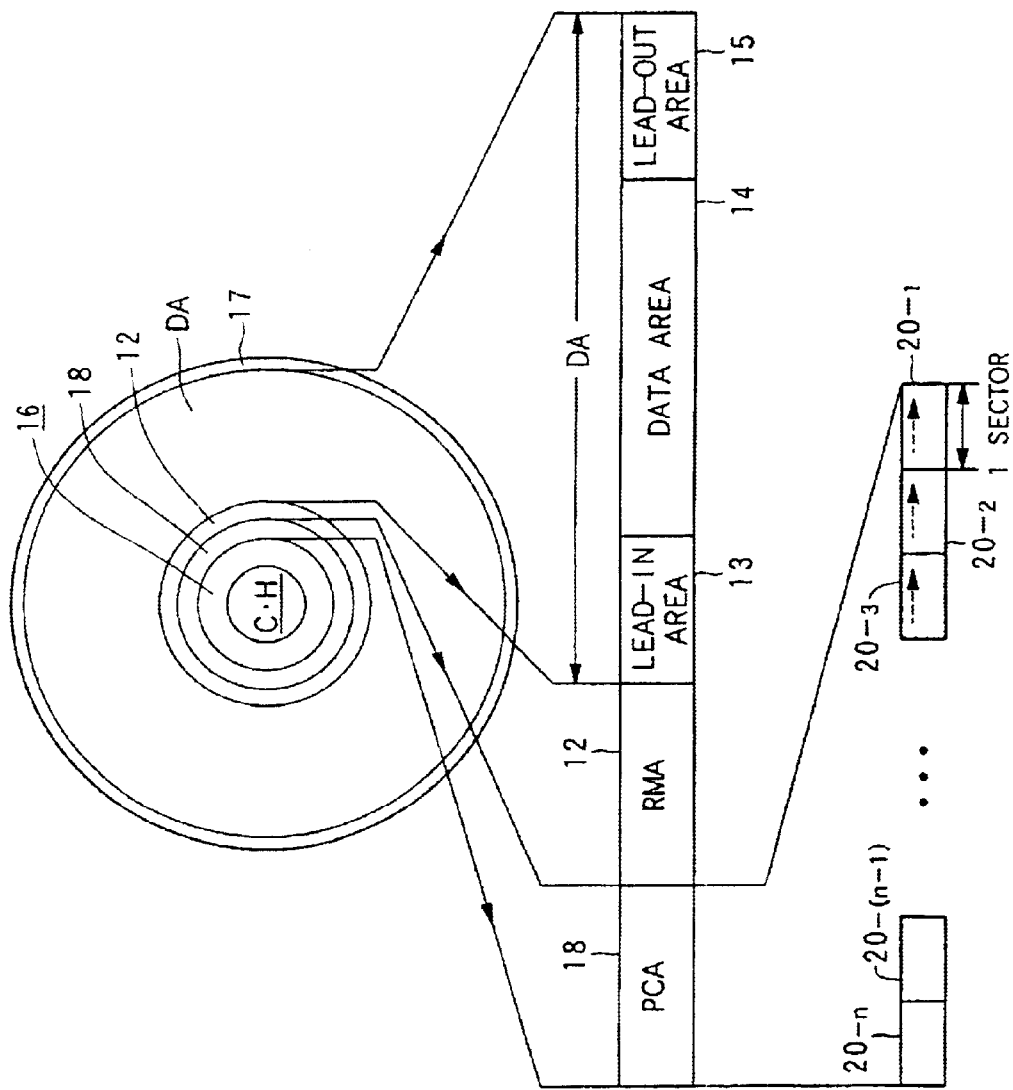
FIG. 2 is a schematic view showing the detailed structure of a DVD-R according to the embodiment.

FIG. 1 is a block diagram showing the schematic structure of the information recording apparatus of the embodiment, and FIG. 2 is a schematic view showing the detailed structure of a DVD-R1.

As illustrated in FIG. 1, an information recording apparatus R of the embodiment is comprised of: a pickup 2 as retrieving device, setting signal recording device, detecting device, performing device, and a mark signal recording device; an RF (Radio Frequency) detecting section 3; a control section 4 comprised of a CPU and the like as checking device, position retrieving device, first moving device, second moving device, and setting device; a timing creating unit 5; a recording power setting section 6; a recording pattern generating section 7; a recording waveform creating section 8; a driving section 9; a laser driver 10; a pre-format detecting section 11; a condenser 21; a level detecting section 24 including a peak detecting section 22 and a bottom detecting section 23; and a switch 25.

An operation of each component will be described now.

At first, an operation of general information recording processing will be described.

Address information indicating the position of the recorded information on the DVD-R1 and a synchronization signal are previously recorded (in its manufacturing stage) by forming a pre-pit.

At the timing of recording information on the DVD-R1, the pickup 2 irradiates an optical beam B for information recording to the pre-pit just before the actual information recording, detects the address information indicating the record position of the information to be recorded entered from the outside and the synchronization signal for creating a recording clock used as a reference clock in the recording processing, according to, for example, a push-pull method, and creates a push-pull signal Spp including the above two so to supply it to the pre-format detecting section 11.

Then, the pre-format detecting section 11 separates the push-pull signal Spp into the synchronization signal Ssyc and the address information Sadr, and supplies the synchronization signal Ssyc to the timing creating section 5 and the address information Sadr to the control section 4.

The timing creating section 5 creates the recording clock signal Stm based on the synchronization signal Ssyc, and supplies it to the recording power setting section 6 and the recording pattern generating section 7.

While, the recording information Sr entered from the outside is supplied to the control section 4.

The control section 4 adds an error correction mark to the supplied recording information Sr and modulates the supplied recording information Sr. Based on the address information Sadr, it recognizes the record position on the DVD-R1 to record the supplied recording information Sr, and supplies the recording information Sr to the recording waveform creating section 8 through the switch 25, as the recording signal Srr at the timing corresponding to the record position.

The recording pattern generating section 7 generates a recording pattern signal Spt having a random pulse width from 3T to 11T, using recording clock signal Stm as a reference clock, based on the control signal Sct from the control section 4, and supplies it to the recording waveform creating section 8 through the switch 25, in the normalization processing described later.

The recording waveform creating section 8 performs the waveform shaping processing (strategy processing), which shapes and optimizes the form of the recording pit formed in the recording track on the DVD-R1 correspondingly to the waveform of the recording pattern signal Spt, on the recording signal Srr or the recording pattern signal Spt, and generates a shaped pattern signal Ssr to supply it to the driving section 9.

While, the recording power setting section 6 generates a power signal Spc indicating the recording power set in the recording power setting processing described later which is executed prior to the information recording, based on the control signal Scp from the control section 4, and supplies it to the driving section 9.

The driving section 9 generates a driving signal Sdd for irradiating the optical beam B for recording by the recording power indicated by the power signal Spc and supplies it to the driver 10.

The driver 10 drives a semiconductor laser, not illustrated, within the pickup 2, so as to generate a driving signal Sd for irradiating the recording optical beam B intensity-modulated correspondingly to the waveform change indicated by the shaped pattern signal Ssr, with reference to the recording power indicated by the power signal Spc, and so as to supply it to the semiconductor laser within the pickup 2.

The recording optical beam B corresponding to the original recording information Sr is irradiated on the DVD-R1 by driving the semiconductor laser according to the driving signal Sd, hence to form a recording pit corresponding to the recording information Sr in the recording track on the DVD-R1, thereby completing a serried of recording processing of the recording information Sr.

The calibration processing of the recording power concerned with the embodiment, which is performed prior to the above-mentioned recording processing, will be described.

As mentioned above, the calibration processing concerned with the embodiment is performed by using the PCA and RMA formed in the inner portion than the lead-in area on the DVD-R1.

The detailed structure of the DVD-R1 including the PCA and the RMA will be described by using FIG. 2.

As illustrated in FIG. 2A, the DVD-R1 of the embodiment is comprised of: from the inside, a clump hole CH for mounting and fixing the DVD-R1 around a rotation axis of a spindle motor, not illustrated, within the information recording unit R; a non-recordable area 16 where information is not recorded on the inner peripheral side; the PCA 18; the RMA 12; an information area DA where actual recording processing is performed; and an end area 17.

The information area DA is further comprised of: a lead-in area 13 where start information and the like to be read out when reproducing the recording information recorded in a data area 14 described later is recorded; the data area 14 where the recording information is recorded; and a lead-out area 15 where end information and the like to be read out when finishing the playback of the recording information recorded in the data area 14 is recorded. The lead-in area 13 is an area for recording the start information and the like prior to recording the information in the data area 14, while the lead-out area 15 is an area for recording the end information and the like after fully finishing the recording on the overall DVD-R1 (namely, when all recording of the recording information for the DVD-R1 is finished).

The PCA 18 is divided into the number N of sectors 20 (for example, N is 7000), and one or more of these sectors 20 are used to perform the calibration processing of the recording power of the recording optical beam B.

Further, it is standardized that the respective sectors 20 are used sequentially from the sector $20_{-1}$ on the outer periphery of the DVD-R1.

For example, in the case of performing one calibration processing by use of only one sector 20, one calibration processing is performed on the sector $20_{-1}$ by recording a setting signal with the recording power increasing sequentially from the inner periphery to the outer periphery (refer to a dotted line of FIG. 2), and the next calibration is performed on the sector $20_{-2}$ by recording a setting signal with the recording power increasing sequentially from the inner periphery to the outer periphery (refer to a dotted line of FIG. 2).

While, the RMA 12 is provided with 400 setting recording areas for sequentially writing the values of the optimum recording powers having been set in the above calibration processing at a predetermined timing and the numbers of the sectors 20 within the PCA 18 having been used so far for the calibration processing.

Returning to FIG. 1, in the above calibration processing by use of the PCA 18 and the RMA 12, for example, in the case of performing one calibration processing by use of only one sector 20 as mentioned above, at first, the control section 4 supplies the control signal Sct to the recording pattern generating section 7 so as to generate the recording pattern signal Spt having the above-mentioned random pulse width from 3T to 11T.

The control section 4 supplies the control signal Scp to the recording power setting section 6 so as to control it to record the setting signal on the sector $2_{-1}$ while increasing the recording power step-by-step from the inner periphery to the outer periphery (refer to the dotted line of FIG. 2).

Thus, the recording power setting section 6 supplies the power signal Spc in a manner of increasing the recording power step-by-step.

The driving section 9 and the driver 10 record the setting signal sequentially within the sector $20_{-1}$ while increasing the recording power step-by-step based on the power signal Spc. This processing enables the setting signal step-by-step varying in a staircase pattern in the playback intensity to be recorded in the sector $20_{-1}$.

The peak level and the bottom level of the detected signal Srf obtained by reproducing the setting signal recorded in the above way, using the pickup 2, are detected by the level detecting section 24.

The level detecting section 24 eliminates the direct current component of the detected signal Srf through the condenser 21, obtains the peak level and the bottom level of the condenser signal Scd that is the resultant output, respectively through the peak detecting section 22 and the bottom detecting section 23, and supplies a peak level signal Spl and a bottom level signal Sbl to the control section 4.

Thus, the control section 4 sets the recording power in recording the setting signal in which the peak level is equal to the bottom level for every detected signal Srf corresponding to the pulse width from 3T to 11T, based on the peak level signal Spl and the bottom level signal Sbl, as the optimum recording power at that time, in the memory, not illustrated, hence to use it for the recording processing of the actual recording information Sr thereafter.

The calibration processing concerned with the embodiment executed chiefly by the control section 4 will be described more concretely by using FIG. 3 to FIG. 5.

Figure 3:
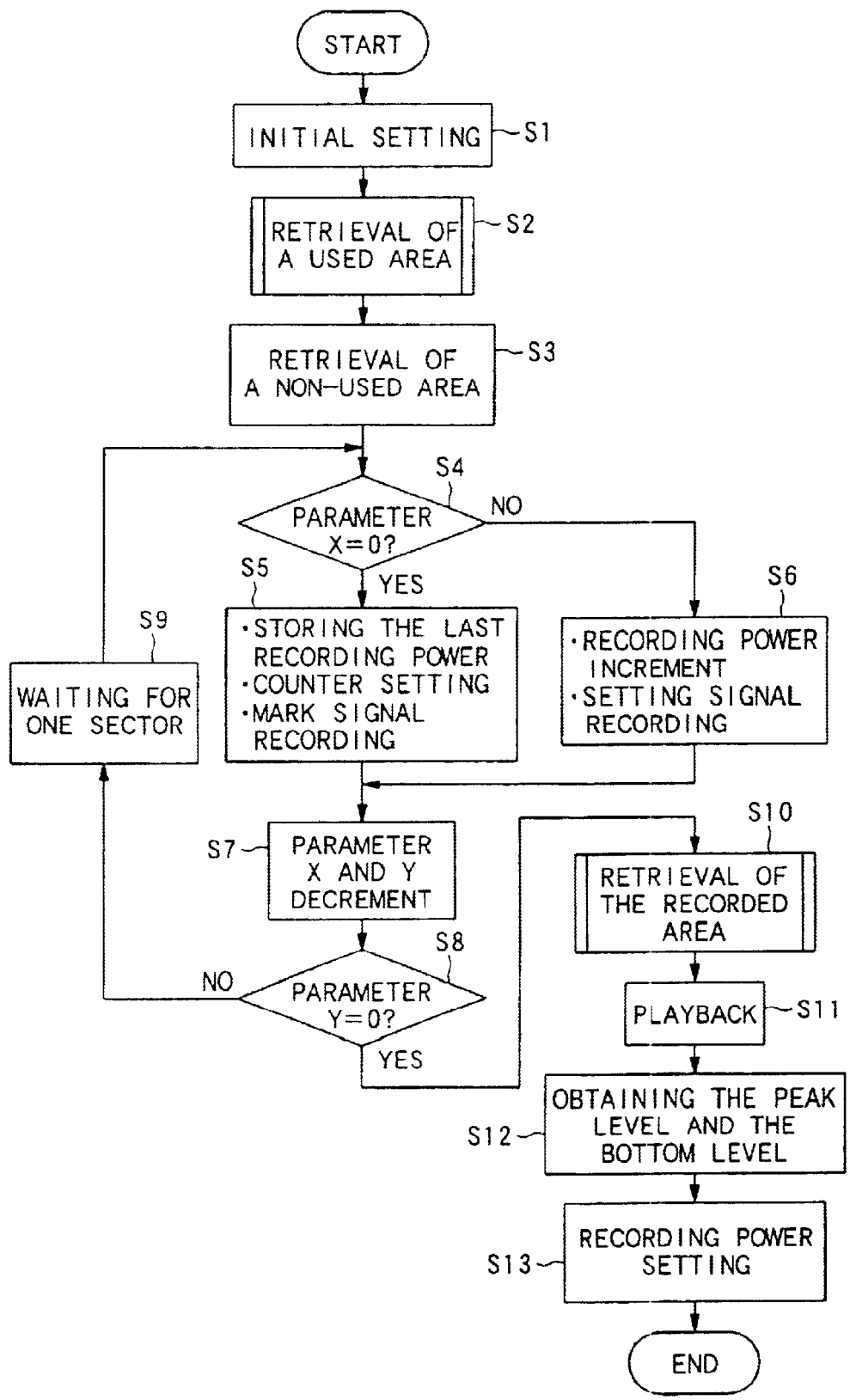
FIG. 3 is a flow chart (I) showing the recording power setting processing according to the embodiment.
Figure 4:
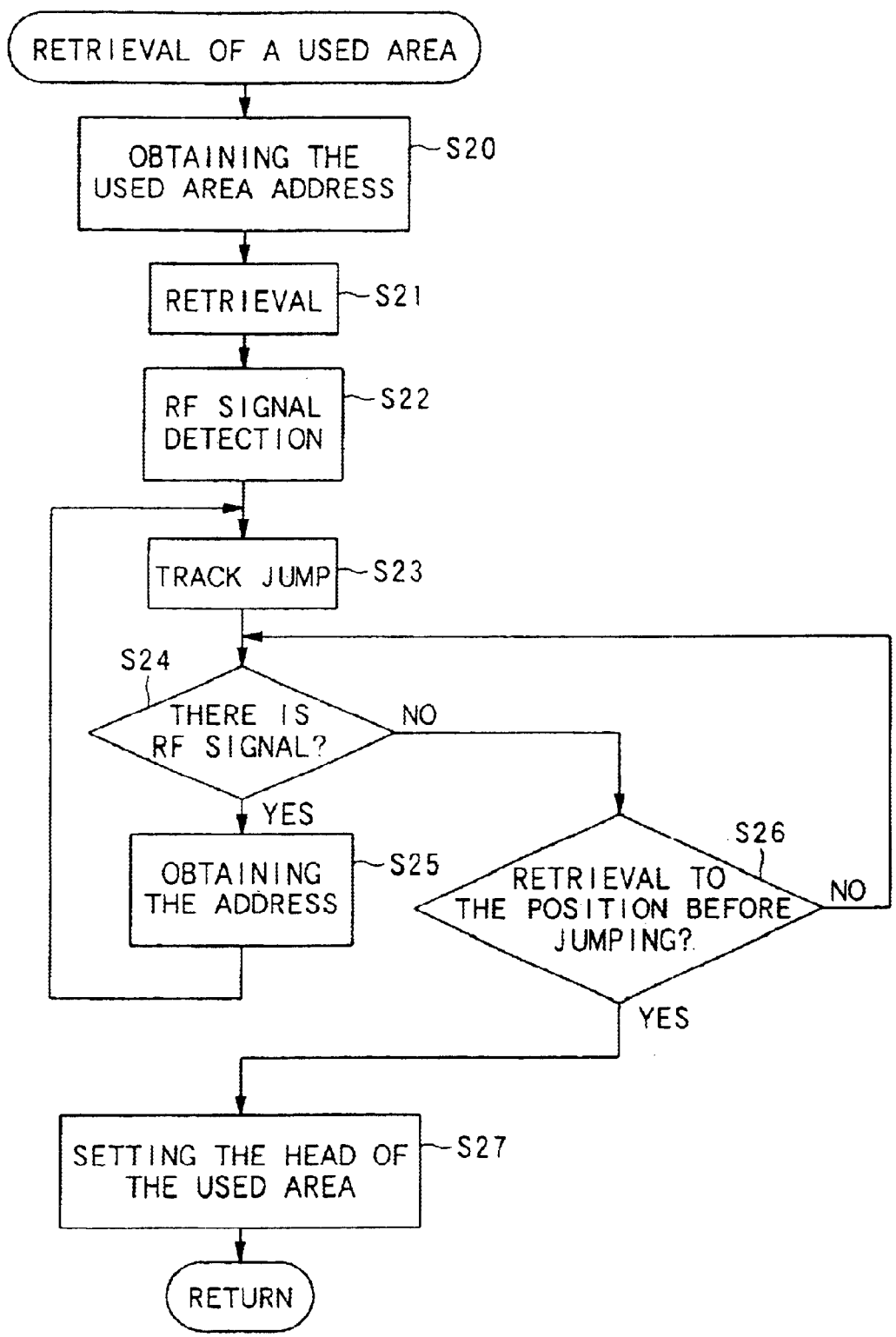
FIG. 4 is a flow chart (II) showing the recording power setting processing according to the embodiment.
Figure 5:
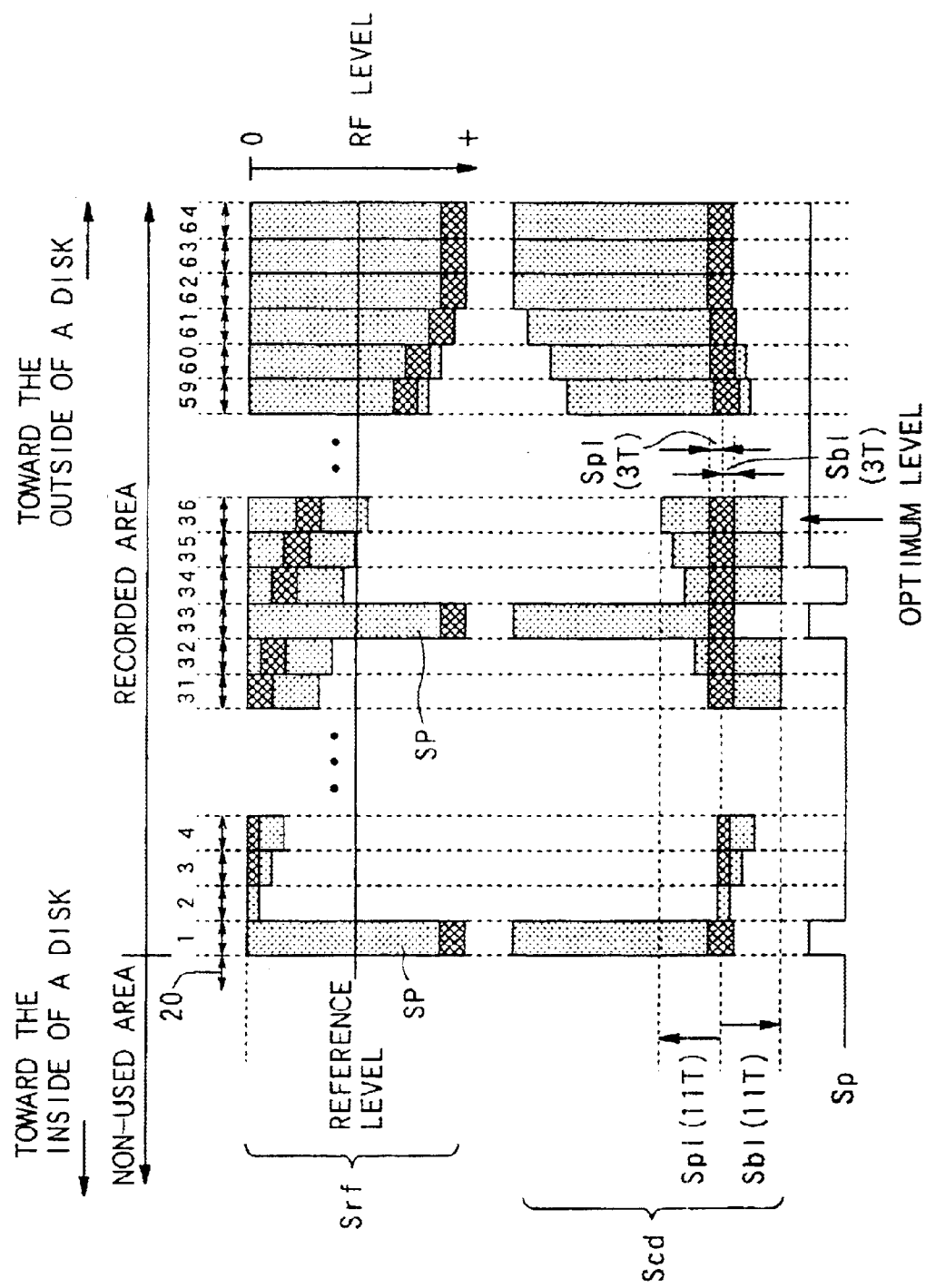
FIG. 5 is a view showing various waveforms corresponding to the recording power setting processing of the embodiment.

FIG. 3 and FIG. 4 are flow chars showing the calibration processing, and FIG. 5 is a view showing various waveforms corresponding to the calibration processing.

In the calibration processing described later, one calibration processing is executed by using 64 pieces of sectors 20, and further in one sector 20, the setting signal is recorded with the same recording power and a mark signal described later is recorded in every 32 sectors. Further, in FIG. 5, the level of the detected signal Srf becomes higher in a downward direction.

As illustrated in FIG. 3, in the calibration processing of the embodiment (recording power setting processing), at first, each initial setting is executed (Step S1).

Now, the initial setting processing in Step S1 will be more specifically described. In the initial setting processing, a parameter X that is the counter value (incremented by one every time the recording power is increased by one step) indicating the space between the mark signals when a plurality of mark signals described later are recorded, is initialized(namely, parameter X←0), the number M of changed steps of the recording power(in the case of embodiment is M=64) is set in a parameter Y indicating the changing frequency of the recording power when the setting signal is recorded, and further, the initial value of the recording power (more specifically, the minimum value defined by the DVD-R format) is set in recording the setting signal other than the mark signal.

When the initial setting is finished, in the PCA 18, the head position of the sectors 20 used for the calibration processing so far having been executed (in other words, the head position of the used area) is retrieved on the DVD-R1 (Step S2). The retrieval processing will be described later by using FIG. 4.

When the head position of the used area is retrieved, the position of irradiating the optical beam B is inwardly moved from the head position by the 64 sectors, and the head position of the sectors 20 used for the next calibration processing (in other words, the head position of the non-used area) is retrieved on the DVD-R1 (Step S3). In the retrieval processing in Step S3, more specifically, the head position of the sectors 20 used for the next calibration processing is retrieved by referring to the number of the respective sectors 20 (address information) previously recorded by the pre-pit.

The position of irradiating the optical beam 13 is moved, according to the retrieval, by operating a tracking servomechanism, not illustrated, based on a control of the control section 4.

When the head position of the non-used area is retrieved, whether the value of the parameter X is now "0" or not is checked (Step S4).

Just after retrieving the non-used area, since the parameter X is "0" (YES; Step S4), the recording power when the setting signal is recorded last is stored in a memory, not illustrated, within the control section 4, "32" (indicating that the mark signal is to be recorded in every 32 sectors) is set in the parameter X, and in the information recording unit R, the mark signal is recorded within the sector 20 for a predetermined hour with the possible maximum recording power (Step S5). According to the processing of Step S5, the initial mark signal is recorded at the head position of the non-used area.

The parameters X and Y are decremented by one (Step S7), and whether the parameter Y becomes "0" or not, in other words, whether one calibration processing is completed or not is checked (Steps S8).

Since the one calibration processing is not finished yet (NO; Step S8), this step will return to Step S4 again, after the recording time for one sector elapses (Step S9).

Since the value of the parameter X is not "0" in this Step S4 (NO; Step S4), the setting signal is recorded with the recording power of the setting signal increased by one step from the initial value set in Step S1 (Step S6), and this step will return to Step S7 again, where each parameter is decremented by one (Step S7), thereby repeating a series of the above-mentioned processing.

By repeating the processing from Step S1 to Step S9 as mentioned above, the second mark signal is recorded at the head position of the non-used area and at the position distant from the head position by 32 sectors (since one calibration processing is completed by using 64 sectors in the calibration processing of this embodiment, there are only two mark signals that are recorded between the one calibration processing), and the setting signal is recorded with the recording power increased by every one step for every sector up to the maximum value, in the space between the mark signals and the space between the mark signal and the end position of the non-used area.

When the recording of the setting signal for 64 sectors is completed (YES; Step S8), the head position of the recorded area (the recorded area within the PCA18 where the mark signal and the setting signal are recorded according to the processing of the above Step S1 to Step S9) is retrieved according to the same processing as in the above-mentioned Step S2 (Step S10), and from the head position, the setting signal and the mark signal for 64 sectors are detected and reproduced, hence to create the detected signal Srf (Step S11) Further, the level thereof is obtained in the RF detecting section 3 (Step S12), and the level signal Sp is created and supplied to the control section 4.

As the waveform of the detected signal Srf at that time, as show in FIG. 5, a special detected signal SP of the maximum level corresponding to the mark signal is detected at the head position of the recorded area formed by process of step1 to step 9 and the position outwardly distant from the head position by 32 sectors, and from the area between the both positions, the detected signals Srf having the playback level corresponding to the respective setting signals outwardly increased in every sector are detected. The level signal Sp which becomes the "HIGH" level (refer to the bottom of FIG. 5) at a time of detecting the detected signal Srf having a level more than the predetermined optimum level, of these special detected signals SP and the detected signals Sfr, is supplied to the control section I.

Based on the peak level signal Spl and the bottom level signal Sbl supplied from the level detecting section 24, when the setting signal having the peak level and the bottom level which are equal to each other, for every detected signal Sfr corresponding to the pulse width from 3T to 11T (refer to the timing T) is obtained, the recording power at that time is set in a memory, not illustrated, within the control section 4 as the optimum recording power (Step S13), and thereafter used for the recording processing of the actual recording information Sr.

After a series of the calibration processing shown in FIG. 3 is finished, the number of a sector used as the recorded area and the recording power set in the above are recorded within the setting recording area corresponding to the RMA12.

The retrieval processing from Step S2 to Step S10 will be described by using FIG. 4.

In the retrieval processing, as illustrated in FIG. 4, at first, the setting recording area where the used (recorded) sector number and the setting recording power are recorded in the last calibration processing is retrieved, so to obtain the used (recorded) sector number (address at the head position of the used area (Step S20), and the position of irradiating the optical beam B is moved to the head position (Step S21).

While the irradiation position is moved outwardly from the head position, whether a detected signal Srf having some level is detected or not is checked (Step S22).

The irradiation position is inwardly jumped to a position for two tracks in a way of skipping over 64 sectors (Step S23), referring to the address information recorded by the pre-pit from the first position of detecting the detected signal Srf, and while moving the irradiation position again outwardly from the moved position, whether the detected signal Srf is detected or not is checked and retrieved(Step S24).

When detecting the detected signal Srf having some level (YES, Step S24), the current irradiation position is regarded to be within the used (recorded) area, the address of the position is obtained (Step S25) and this step will return to Step 23, where the above-mentioned track jump processing will be repeated.

While, in the judge of Step S24, when no detected signal Srf is detected (NO; Step S24), whether or not the check and retrieval has been completed in the irradiation position before the track jump (Step S23) is checked (Step S26) When the check and retrieval has not been completed (NO; Step S26), this step will return to Step S24 again, where the check and retrieval is continued, while when the check and retrieval has been completed (YES; Step S26), the position corresponding to the last obtained address (Step S25) is regarded as the head position the used (recorded) area (Step S27), and then the processing will be returned to Step S3 or Step S11.

As mentioned above, according to the above calibration processing in the information recording unit R, the non-used area is retrieved, referring to the special detected signal SP, to record the mark signal and the setting signal, and the setting of the recording power is performed, using thus recorded setting signal. Therefore, the non-used area can be retrieved accurately and by using this, the setting of the recording power can be performed accurately.

Since the mark signal is recorded at the position detected prior to the setting signal, the first detected position can be accurately detected in the PCA18, thereby detecting the non-used area assuredly.

Since the mark signal is recorded in every 32 sectors during recording of the setting signal, detection error of the non-used area caused by detecting no special detected signal SP for a long time can be prevented.

Since the used (recorded) area is detected based on the special detected signal SP while repeating the transition of the irradiation position of the optical beam B from the head position of the used (recorded) area indicated by the RMA 12 to the position of detecting the detected signal Srf and the update of the same head position, the non-used area can be detected assuredly.

Since the information recording is executed by using the set recording power, the information recording can be executed accurately and assuredly by using the accurately-set recording power.

In the above-mentioned embodiment, although the description has been made in the case of one calibration processing by use of 64 sectors, the same effect as the present invention can be obtained even in the case of one calibration processing by use of only one sector 20, if the mark signal is recorded at the head.

In the above-mentioned embodiment, although the description has been made in the case where the present invention is adopted to the calibration processing of the recording power on the DVD-R1, the present invention can be adopted to the calibration processing of the recording power on a general CD-R (CD-Recordable).

Further, with a program corresponding to the flow charts shown in FIG. 3 and FIG. 4 recorded in a flexible disk or a hard disk as the information recording medium, this program can be read out and executed by a general microcomputer or the like. Therefore, the same microcomputer may be used as the control section 4 of the embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-313588 filed on Oct. 13, 2000 including the specification, claims, drawings and summary is incorporated herein by reference in its entirety.

What is claimed:

1. A parameter setting apparatus for setting a recording parameter for use in optical information recording on a recording medium, by use of any one of a plurality of setting areas previously provided on the recording medium, the apparatus comprising:

a checking device for checking whether a special detected signal is optically detected or not from the setting areas;

a locating device for locating a non-used area that is the setting area where no special detected signal is detected, of the setting areas, based on the check result of the checking device;

a mark signal recording device for optically recording a mark signal for obtaining the special detected signal optically, in the non-used setting area;

a setting signal recording device for recording a setting signal for setting the recording parameter, at least, in the non-used setting area excluding an area where the mark signal is recorded; and a setting device for setting the recording parameter by optically detecting the recorded setting signal.

2. The parameter setting apparatus according to claim 1, wherein the mark signal recording device records the mark signal at a position detected prior to the setting signal recorded in the non-used setting area.

3. The parameter setting apparatus according to claim 1, wherein the mark signal recording device repeats the recording of the mark signal at a predetermined interval during the recording of the setting signal.

4. The parameter setting apparatus according to claim 2, wherein the mark signal recording device repeats the recording of the mark signal at a predetermined interval during the recording of the setting signal.

5. The parameter setting apparatus according to claim 3, wherein the checking device further comprises:

a position retrieving device for retrieving a predicted position of the setting area on the recording medium where the special detected signal is to be optically detected;

a first moving device for moving an executing device for detecting the setting signal and the special detected signal, from the retrieved predicted position, to a retrieval starting position on the recording medium distant from there at least by a distance corresponding to the predetermined interval; and a second moving device for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not; and the locating device regards the setting area adjacent to the setting area where the special detected signal detected last is recorded as the non-used setting area, when none of the special detected signal is detected while the executing device is moved from the retrieval starting position to the predicted position.

6. The parameter setting apparatus according to claim 1, wherein the recording parameter is intensity of an optical beam for use in the information recording.

7. The parameter setting apparatus according to claim 1, further comprising a recording device for executing the information recording by use of the set recording parameter.

8. A parameter setting method for setting a recording parameter for use in optical information recording on a recording medium, using any one of a plurality of setting areas previously provided on the recording medium, the method comprising:

a checking process for checking whether a special detected signal is optically detected or not from the setting areas;

a locating process for locating a non-used area that is the setting area where no special detected signal is detected, of the setting areas, based on the check result in the checking process;

a mark signal recording process for optically recording a mark signal for obtaining the special detected signal optically, in the non-used setting area;

a setting signal recording process for recording a setting signal for setting the recording parameter, at least, in the non-used setting area excluding an area where the mark signal is recorded; and a setting process for setting the recording parameter by optically detecting the recorded setting signal.

9. The parameter setting method according to claim 8, wherein in the mark signal recording process, the mark signal is recorded at a position detected prior to the setting signal recorded in the non-used setting area.

10. The parameter setting method according to claim 8, wherein in the mark signal recording process, the recording of the mark signal is repeated at a predetermined interval during the recording of the setting signal.

11. The parameter setting method according to claim 9, wherein in the mark signal recording process, the recording of the mark signal is repeated at a predetermined interval during the recording of the setting signal.

12. The parameter setting method according to claim 10, wherein the checking process further comprises:

a position retrieving process for retrieving a predicted position of the setting area on the recording medium where the special detected signal is to be optically detected;

a first moving process for moving an executing device for detecting the setting signal and the special detected signal, from the retrieved predicted position, to a retrieval starting position on the recording medium distant from there at least by a distance corresponding to the predetermined interval; and a second moving process for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not; and in the locating process, the setting area adjacent to the setting area where the special detected signal detected last is recorded, is regarded as the non-used setting area, when none of the special detected signal is detected while the executing device is moved from the retrieval starting position to the predicted position.

13. The parameter setting method according to claim 8, wherein the recording parameter is intensity of an optical beam for use in the information recording.

14. The parameter setting method according to claim 8, further comprising a recording process for executing the information recording by use of the set recording parameter.

15. An information recording medium in which a setting program is recorded in a readable way by a setting computer, which is included in a recording parameter setting apparatus for setting a recording parameter for use in optical information recording on the recording medium, using any one of a plurality of setting areas previously provided on the recording medium, the setting program causing the setting computer to function as:

a checking device for checking whether a special detected signal is optically detected or not from the setting areas;

a locating device for locating a non-used area that is the setting area where no special detected signal is detected, of the setting areas, based on the check result of the checking device;

a mark signal recording device for optically recording a mark signal for obtaining the special detected signal optically, in the non-used setting area;

a setting signal recording device for recording a setting signal for setting the recording parameter, at least, in the non-used setting area excluding an area where the mark signal is recorded; and a setting device for setting the recording parameter by optically detecting the recorded setting signal.

16. The information recording medium according to claim 15, wherein the mark signal recording device records the mark signal at a position detected prior to the setting signal recorded in the non-used setting area.

17. The information recording medium according claim 15, wherein the mark signal recording device repeats the recording of the mark signal at a predetermined interval during the recording of the setting signal.

18. The information recording medium according claim 16, wherein the mark signal recording device repeats the recording of the mark signal at a predetermined interval during the recording of the setting signal.

19. The information recording medium according to claim 17, wherein the checking device further comprises:

a position retrieving device for retrieving a predicted position of the setting area on the recording medium where the special detected signal is to be optically detected;

a first moving device for moving an executing device for detecting the setting signal and the special detected signal, from the retrieved predicted position, to a retrieval starting position on the recording medium distant from there at least by a distance corresponding to the predetermined interval; and a second moving device for repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not; and the locating device regards the setting area adjacent to the setting area where the special detected signal detected last is recorded as the non-used setting area, when none of the special detected signal is detected while the executing device is moved from the retrieval starting position to the predicted position.

20. The information recording medium according to claim 15, wherein the recording parameter is intensity of an optical beam for use in the information recording.

21. The information recording medium according claim 15, wherein the setting program further causes the setting computer to function as:

a recording device for executing the information recording by use of the set recording parameter.

22. A computer data signal embodied in a carrier wave and representing a sequence of instructions, which is executed by a setting computer, which is included in a recording parameter setting apparatus for setting a recording parameter for use in optical information recording on the recording medium, using any one of a plurality of setting areas previously provided on the recording medium, said instructions comprising the steps of:

checking whether a special detected signal is optically detected or not from the setting areas;

locating a non-used area that is the setting area where no special detected signal is detected, of the setting areas, based on the check result of the step of checking;

optically recording a mark signal for obtaining the special detected signal optically, in the non-used setting area;

recording a setting signal for setting the recording parameter, at least, in the non-used setting area excluding an area where the mark signal is recorded; and setting the recording parameter by optically detecting the recorded setting signal.

23. The computer data signal embodied in a carrier wave and representing a sequence of instructions according to claim 22, wherein the step of optically recording the mark signal records the mark signal at a position detected prior to the setting signal recorded in the non-used setting area.

24. The computer data signal embodied in a carrier wave and representing a sequence of instructions according claim 22, wherein the step of optically recording the mark signal repeats the recording of the mark signal at a predetermined interval during the recording of the setting signal.

25. The computer data signal embodied in a carrier wave and representing a sequence of instructions according claim 23, wherein the step of optically recording the mark signal repeats the recording of the mark signal at a predetermined interval during the recording of the setting signal.

26. The computer data signal embodied in a carrier wave and representing a sequence of instructions according to claim 24, wherein the step of checking further comprises the steps of:

retrieving a predicted position of the setting area on the recording medium where the special detected signal is to be optically detected;

moving an executing device for detecting the setting signal and the special detected signal, from the retrieved predicted position, to a retrieval starting position on the recording medium distant from there at least by a distance corresponding to the predetermined interval; and repeating an operation of further moving the executing device again from the special detected signal-detected position on the recording medium to a position on the recording medium distant from there at least by a distance corresponding to the predetermined interval, when the special detected signal is detected while the executing device is moved from the retrieval starting position to the predicted position, and further moving the executing device to the predicted position, from a position of the executing device after the above further moving used as the retrieval starting position, so as to check whether the special detected signal is detected or not, and the step of locating the non-used area regards the setting area adjacent to the setting area where the special detected signal detected last is recorded as the non-used setting area, when none of the special detected signal is detected while the executing device is moved from the retrieval starting position to the predicted position.

27. The computer data signal embodied in a carrier wave and representing a sequence of instructions according to claim 22, wherein the recording parameter is intensity of an optical beam for use in the information recording.

28. The computer data signal embodied in a carrier wave and representing a sequence of instructions according to claim 22, wherein said instructions further comprises the step of executing the information recording by use of the set recording parameter.

* * * * *